Dec. 22, 1925.

H. C. BERENTS

AUTOMOBILE SIGNAL

Filed Oct. 5, 1923

1,566,363

Harry C. Berents, Inventor

By his Attorney

Patented Dec. 22, 1925.

1,566,363

UNITED STATES PATENT OFFICE.

HARRY C. BERENTS, OF BELLEMORE, NEW YORK.

AUTOMOBILE SIGNAL.

Application filed October 5, 1923. Serial No. 666,724.

*To all whom it may concern:*

Be it known that I, HARRY C. BERENTS, a citizen of the United States, and resident of Bellemore, in the county of Suffolk and State of New York, have invented certain new and useful Improvements in Automobile Signals, of which the following is a specification.

This invention relates to automobile safety signals and has particular reference to a self lighting automatic reflecting signal adapted to be applied to automobiles to be lit up by the headlights of another automobile approaching the signal.

I have discovered that a signal of the type aforesaid may be constructed by applying a thin coating of transparent colored lacquer to a suitable member having a reflecting surface, such for instance as a piece of glass having a white or silvered surface to which the colored transparent coating is applied.

As an equivalent of the coating, special kinds of very high grade thin colored glasses may be used.

The peculiarity of such a signalling means is that it is hardly visible, at least not reflecting, in ordinary daylight or sun light. But when a concentrated beam of light, such for instance as from an automobile headlights, is directed towards the signal at night time or in the evening, the signal will commence to glow and become illuminated and prominent by reason of reflected light from the white or silvered surface shining through the colored coating or glass.

I have found, however, that while glass may be used, the colored coating of transparent thin lacquer is far more efficient and brilliant.

In accordance with the foregoing, therefore, it is the object of my invention to provide a self illuminating signal for automobiles adapted to be lighted from an independent source of light.

Another object of the invention is to combine the self illuminating signal with a rear view mirror as a single article of manufacture. In the drawing accompanying this specification—

Figure 1:
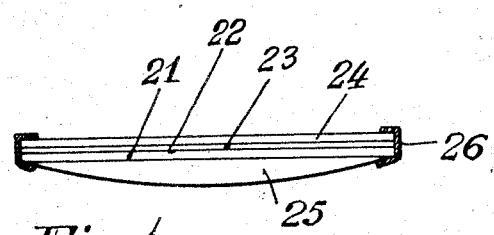
Figure 1 is a plan view of a signal embodying the invention.
Figure 2:
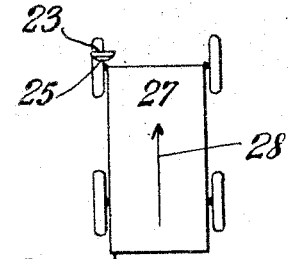
Figure 2 is a diagrammatic representation of an automobile equipped with signals embodying the invention.

Referring to Figures 1 and 2 the reference numeral 21 denotes a suitable base member having a reflecting surface 22 to which is applied a thin coating 23 of transparent high grade lacquer colored red. The base member may be glass, metal or other substance, for instance metal foils are suitable as base members. The reflecting surface 22 may be a separate applied substance, or may be inherent in the base member. The numeral 24 indicates a protecting piece of glass placed adjacent the reflecting base.

The reflecting signal may be coupled with a rear view mirror as a novel article of manufacture and as shown in Figure 1, where at the rear of the base member there is placed a rear view mirror 25. All the elements are contained within a suitable casing 26.

The use of this type of signal is shown in Figure 2 in which the vehicle 27 proceeds in the direction of the arrow 28. At the front is placed the signal shown in Figure 1, hence, a safety reflecting signal will be operated by an automobile approaching in the opposite direction. If, for instance, the said automobile or vehicle 27 should not show headlight, its approach will nevertheless be signalled. And at the rear of the vehicle 27 is shown a signal 12 of the type illustrated in Figure 1 providing the advantages described above but with the rear view mirror illuminated. In the day time the rear view mirror 25 operates as usual. In this manner both ends of the vehicle 27 will show reflecting red signals at night.

The invention as herein disclosed is susceptible of many changes and different practical applications, and I claim all such changes and modification as come within the legitimate and intended scope of the appended claim.

I claim:—

As a new article of manufacture an automobile signal consisting of a base member having a light reflecting surface, a coating of transparent red lacquer applied to said surface, a protecting plain glass placed against the lacquered surface, a rear view mirror placed against the said base member adjacent the non-lacquered surface thereof and a frame encasing all of the aforesaid members.

H. C. BERENTS.